US011453066B2

(12) United States Patent
Heckel et al.

(10) Patent No.: US 11,453,066 B2
(45) Date of Patent: Sep. 27, 2022

(54) ADJUSTING DEVICE FOR A CUTTING TOOL AND CUTTING TOOL HAVING AN ADJUSTING DEVICE

(71) Applicant: Guehring KG, Albstadt (DE)

(72) Inventors: Gerd Heckel, Puschendorf (DE); Hans-Peter Hollfelder, Fuerth (DE); Juergen Thanner, Hilpoltstein (DE)

(73) Assignee: Guehring KG, Albstadt (DE)

( * ) Notice: Subject to any disclaimer, the term of this patent is extended or adjusted under 35 U.S.C. 154(b) by 307 days.

(21) Appl. No.: 16/751,357

(22) Filed: Jan. 24, 2020

(65) Prior Publication Data
US 2020/0282468 A1 Sep. 10, 2020

Related U.S. Application Data

(63) Continuation of application No. PCT/EP2018/070396, filed on Jul. 27, 2018.

(30) Foreign Application Priority Data

Jul. 28, 2017 (DE) ...................... 10 2017 213 047.4

(51) Int. Cl.
*B23B 29/034* (2006.01)

(52) U.S. Cl.
CPC .... *B23B 29/0341* (2013.01); *B23B 29/03417* (2013.01); *B23B 29/03435* (2013.01);
(Continued)

(58) Field of Classification Search
CPC .......... B23B 29/0341; B23B 29/03417; B23B 29/03446; B23B 2260/056; B23B 2270/06
See application file for complete search history.

(56) References Cited

U.S. PATENT DOCUMENTS 2,274,244 A 6/1938 Miller
3,740,161 A 6/1973 Milewski
(Continued)

FOREIGN PATENT DOCUMENTS

DE 21 67 082 B1 8/1980
DE 40 22 579 A1 1/1991
(Continued)

OTHER PUBLICATIONS

International Search Report and Written Opinion of the International Searching Authority (and English translation) from a corresponding International patent application (PCT/EP2018/070396) dated Nov. 19, 2018, 17 pages.
(Continued)

*Primary Examiner* — Boyer D Ashley
*Assistant Examiner* — Reinaldo A Vargas Del Rio
(74) *Attorney, Agent, or Firm* — Burr & Brown, PLLC

(57) ABSTRACT

An adjusting device 17 for fine adjustment of a cutting support 14, which is adjustable on a basic body 12 of a cutting tool 10, relative to the basic body 12, with an adjusting screw 63 which determines the position of the cutting support 14 relative to the basic body 12. The adjusting device 17 comprises a threaded bushing 61 with which the set screw 63 is screwed and which has a wall segment 66 which is elastically deformable transversely to the socket axis 70, and a pressure element 64 arranged laterally of the threaded bushing 61 which presses the wall segment 66 against the set screw 63.

13 Claims, 5 Drawing Sheets

(52) U.S. Cl.
CPC ... *B23B 29/03446* (2013.01); *B23B 2260/056* (2013.01); *B23B 2270/06* (2013.01)

(56) References Cited

U.S. PATENT DOCUMENTS

2008/0175682 A1\* 7/2008 Musil et al. .................. 408/153
2015/0306672 A1 10/2015 Bassett et al.

FOREIGN PATENT DOCUMENTS

DE 20 2013 006 947 U1 8/2013
DE 10 2015 005 470 A1 10/2015

OTHER PUBLICATIONS

DPMAregister from a corresponding German patent application (DE 10/2017 213 047.4 printed on Feb. 12, 2020, 2 pages.
International Preliminary Report on Patentability from a corresponding International patent application (PCT/EP2018/070396) dated Jan. 28, 2020, 7 pages.

\* cited by examiner

ADJUSTING DEVICE FOR A CUTTING TOOL AND CUTTING TOOL HAVING AN ADJUSTING DEVICE

The invention relates to an adjusting device for finely adjusting an insert holder adjustably held on a base body of a cutting tool and a cutting tool with such an adjusting device.

An adjusting device for finely adjusting an insert holder adjustably held on a base body of a cutting tool is used in particular in cases where the objective is to maintain a tight diameter tolerance for a bore. For example, DE 4022579 A1 shows and describes a cutting tool with a base body that can be rotatably driven around a rotational axis and an insert carrier that is radially adjustably arranged on the base body and carries a cutter. The insert holder is designed like a two-armed swing beam, which is pivotably arranged in a pivot bearing aligned transverse to the rotational axis in the base body given a radial adjustment of the cutter arranged on the one lever arm of the swing beam. The insert holder is adjusted via a control device, which has a control rod (referred to as steering rod in DE 4022579 A1) that is displaceably arranged in the base body and has two control surfaces spaced axially apart from each other and slanted in a mutually opposite direction relative to the rod axis, against which a respective one of the lever arms abuts via a pressure pin that can be displaced in the base body in essentially the feeding direction of the insert holder. By initiating a displacement of the control rod on the machine tool side, the control device allows a machine tool-controlled adjustment of the insert holder between an inwardly regulated position, in which the cutter held on the insert holder lies at a minimum diameter, and an outwardly regulated position, in which the cutter held on the insert holder lies at a maximum diameter.

An adjusting screw (referred to as an adjusting bolt in DE 4022579 A1) that can be adjusted against the end face of the allocated pressure pin is arranged in the lever arm of the insert holder lying opposite the cutter in a threaded hole that penetrates through the insert holder. The adjusting screw makes it possible to adjust the insert holder relative to the longitudinal central axis or rotational axis of the base body or the control rod in the base body. The adjusting screw and threaded hole together form an adjusting device integrated into the insert holder for individually adjusting the position of the insert holder relative to the longitudinal central axis or rotational axis of the base body. However, the position of the insert holder cannot be further set beyond this positional adjustment, which usually plays out within a very narrowly limited adjustment range.

In order to achieve a high positioning accuracy, DE 4022579 A1 proposes that the insert holder be centrifugal force-neutral and free of play. To this end, DE 4022579 A1 proposes an embodiment in which a compression spring packet is arranged between the adjusting screw on the one hand and the pressure pin on the other. The spring packet is intended to ensure that there always be zero backlash in the area of the adjustment mechanism, despite the manufacturing inaccuracies. The spring package exerts a compressive force on the adjusting screw, which presses the front thread flanks of the adjusting screw (as viewed in the direction of compressive force) against the opposing thread flanks of the threaded hole. In this respect, a thread play between the front thread flanks of the adjusting screw and the opposing thread flanks of the threaded hole is reduced. However, a thread play existing between the rear thread flanks of the adjusting screw and opposing thread flanks of the threaded hole remains in place, and even increases. While machining a workpiece, however, the cutter inevitably exposes the insert holder to reaction forces varying in size and/or direction, which can result in a radial movement or oscillation of the insert holder due to the still existing thread play between the rear thread flanks of the adjusting screw and opposing thread flanks of the threaded hole. However, a movement or oscillation of the insert holder puts the cutting tool at risk in terms of the desired high positioning accuracy or diameter-related dimensional tolerance.

Proceeding from DE 4022579 A1, the object of the invention is now to create an adjusting device for a cutting tool and a cutting tool with an adjusting device, which can be used for achieving a positional adjustment of an insert holder that is free of play, so as to reliably and easily attain a high diameter-related dimensional tolerance for a tool blade.

This object is achieved by an adjusting device with the features in claim 1 and a cutting tool according to claim 8. Advantageous or preferred further developments are the subject of the dependent claims.

Similarly to the adjusting device known from DE 4022579 A1, an adjusting device according to the invention for finely adjusting an insert holder adjustably held on a base body of a cutting tool relative to the base body has an adjusting screw that determines the position of the insert holder relative to the base body.

Let it be noted that making a corresponding alignment and arrangement on the cutting tool allows the adjusting device according to the invention to be used for setting the axial and/or radial position of the insert holder relative to a longitudinal central axis or rotational axis of the cutting tool.

Let it further be noted that the insert holder mentioned above is generally to be understood as a unit, a part, a body, a means or the like that indirectly or directly carries one or more blades for machining a workpiece. For example, an insert holder according to the invention can be designed like a two-armed lever pivoted to the base body, for example based on the model of the DE 4022579 A1 discussed at the outset, or like an elastically deformable bending beam held on the base body, e.g., like a so-called clamping holder, in particular a short clamping holder, and carry a cutter, for example a cutting insert, a cutting plate or the like, with one or more blades. As a departure from this type of insert holder that indirectly carries one or several blades, however, an insert holder according to the invention can also be designed like a cutter comprised of a single part or piece, for example like a turning tool, a cutting insert, a cutting plate or the like, and directly carry one or more blades for machining a workpiece.

In order to set or reduce the thread play between the male thread of the adjusting screw and the female thread of the threaded hole of the threaded bush, the invention proposes that the adjusting screw not be screwed directly with the base body or the insert holder, but rather with a threaded bush fixed in place in the base body or insert holder. According to the invention, the threaded bush extending along a bush axis has an elastically deformable wall segment transverse, in particular radially, to the bush axis and a pressure element which laterally presses against the wall segment on the outside, i.e., from outside of the threaded bush, and presses the wall segment against the adjusting screw.

The inventive solution is based upon the idea that, by exerting pressure on the elastically flexible wall segment of the threaded bush, an area of the female thread of the threaded bush corresponding to the wall segment is pressed in a direction transverse to the bush axis against the male thread of the adjusting screw that is screwed into the threaded bush, making it possible to reduce the thread play between the area of the female thread of the threaded bush corresponding to the wall segment and the male thread of the adjusting screw in both axial directions. In particular, displacing the area of the female thread of the threaded bush corresponding to the wall segment inwardly against the male thread of the adjusting screw causes the thread flanks of the female thread to be pressed in both axial directions against the opposing thread flanks of the male thread. This limits an axial movement by the adjusting screw inside of the threaded bush.

As opposed to the adjusting device known from DE 4022579 A1, in which the thread play between the male thread of the adjusting screw and the female thread of the threaded hole is reduced by exerting pressure on the adjusting screw in the direction of the hole or screw axis, the thread play between the male thread of the adjusting screw and the female thread of the threaded bush is reduced in the invention by exerting pressure on a wall segment of the threaded bush in a direction transverse to the bush or screw axis.

Thanks to the reduced thread play, an axial movement by the adjusting screw relative to the threaded bush, and thus a movement between the insert holder and the base body of the cutting tool itself, can be limited even if the insert holder is exposed to variable cutting forces while machining a workpiece. Therefore, the adjusting device according to the invention makes it possible to achieve a higher diameter-related dimensional tolerance.

The elastically flexible wall segment can be comprised of a slit that penetrates through the threaded bush wall, in particular an essentially U-shaped slit. In order to ensure an abutment against the adjusting screw that reliably reduces the thread play over an adequate length, the wall segment can extend in an axial direction of the threaded bush.

In addition, the threaded bush can have a flange that comprises a stop at its one end for purposes of fixation on the base body or insert holder. The flange can be used to fix the position of the threaded bush in the direction of the bush axis.

The pressure element that laterally presses against the wall segment can advantageously consist of a clamping screw that is screwed with the base body or insert holder, and presses the wall segment against the adjusting screw. Rotatably actuating the clamping screw makes it possible to adjustably reduce the thread play between the male thread of the adjusting screw and an area of the female thread of the threaded bush corresponding to the wall segment in such a way as to just still allow an actuation of the adjusting screw, but without any disruptive thread play being present any more. As opposed to the adjusting device known from DE 4022579 A1, the inventive solution, in which the pressure element is designed like a clamping screw, makes it possible to not only reduce the thread play, but to set or correct the thread play.

The adjusting device according to the invention is intended in particular for use on an immovably or rotatably operated cutting tool, in which the highest possible diameter-related dimensional tolerance for a cutter is the key objective. One example for this type of cutting tool is a fine boring tool for drilling and reworking an already premade hole, e.g., as shown and described in the DE 4022579 A1 discussed at the outset.

This type of immovably or rotatably operated cutting tool has a base body that extends along a longitudinal central axis or rotational axis, at least one insert holder axially and/or radially adjustably held on the base body, and an adjusting device interposed between the insert holder and base body for setting the axial and/or radial position of the insert holder relative to the longitudinal central axis or rotational axis of the base body.

Based on the model of the cutting tool indicated in DE 4022579 A1, the adjusting screw of the adjusting device can interact via a wedge gear with a central control device arranged in the base body, for example. In this case, the adjusting device is arranged between the central control device and insert holder.

The adjusting device can here be integrated into the base body, wherein the adjusting screw then presses indirectly or directly against the cutter from the base body.

In particular in the event that the cutting tool has a central control device similar to the one indicated in DE 4022579 A1, the adjusting device can be integrated into the insert holder that is axially and/or radially adjustable on the base body, wherein the adjusting screw is then supported indirectly or directly on the base body, for example of a central control device, from the insert holder. For example, if the cutting tool has a central control device similar to the cutting tool indicated in DE 4022579 A1, the adjusting screw can be indirectly (e.g., via a pressure pin) or directly supported in a radial direction on a control slant of the control device.

Regardless of the specific configuration and arrangement of the insert holder on the base body, the threaded bush can be arranged in a through hole in the insert holder, which allows access for actuating the adjusting screw from the side facing away from the base body, for example from radially outside.

The threaded bush can be integrally, positively and/or non-positively fixed in the insert holder in an axial and/or peripheral direction of the through hole.

A preferred embodiment of a multiblade cutting tool with an adjusting device according to the invention will be described below with the help of the attached drawings. Shown on:

PREFERRED EMBODIMENTS

Figure 1:
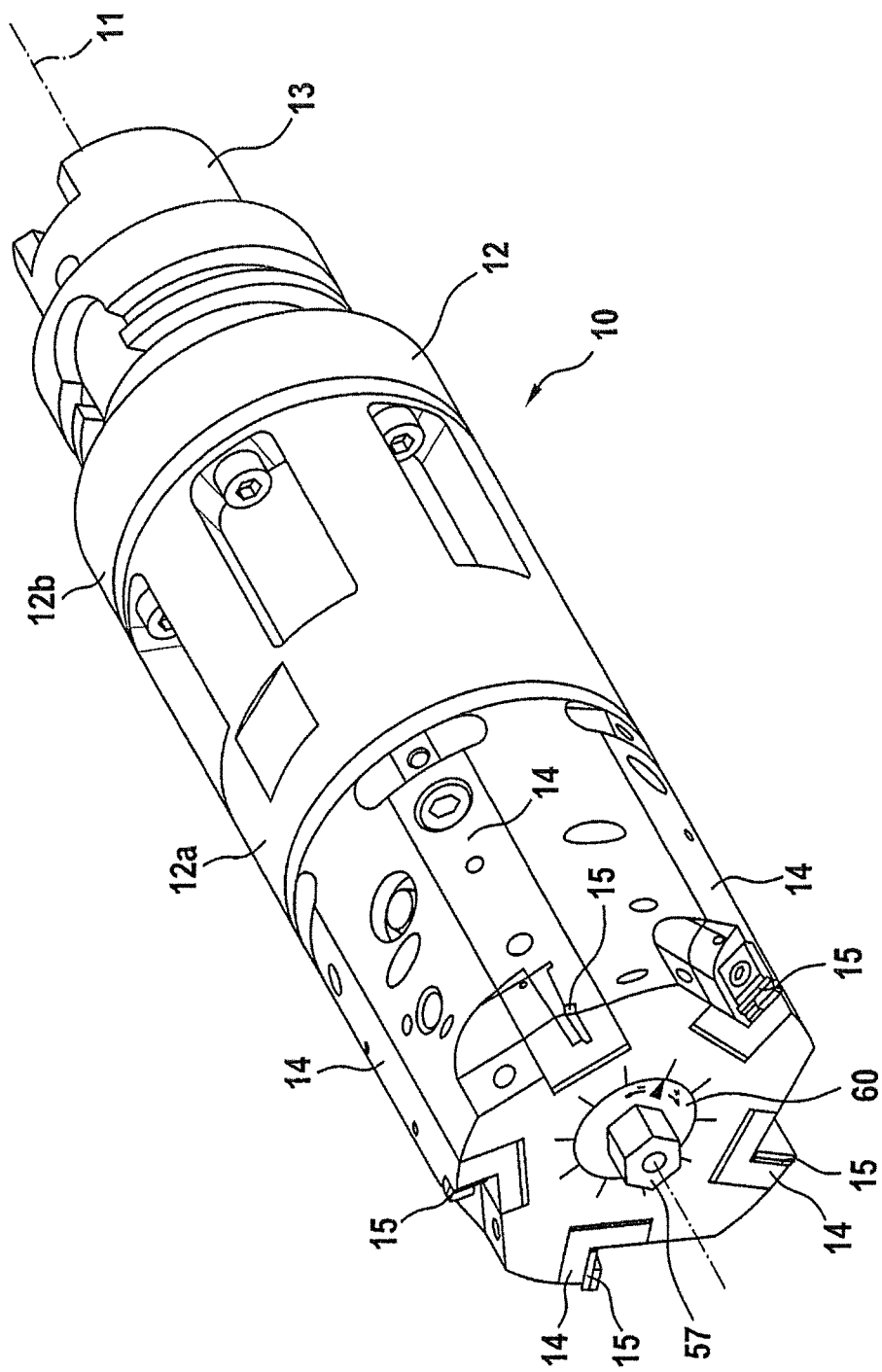
FIG. 1 is a perspective side view of a multiblade cutting tool with an adjusting device according to the invention.

FIG. 1 shows a perspective side view of a multiblade cutting tool 10, for example which is used for machining a cylinder bore of a combustion engine. The cutting tool 10 can thus also be referred to as a cylinder bore machining tool or generally as a bore finishing or bore fine machining tool.

The cutting tool 10 has a base body 12 that extends along a longitudinal central axis or rotational axis 11, which in the embodiment shown is modularly constructed out of a front part and a rear part. As shown on FIG. 1, the front part 12a and rear part 12b are screwed together. The rear (right on FIG. 1) end of the cutting tool 10 has a coupling shaft 13, for example which is to be connected with a machine tool spindle, and in the embodiment shown is comprised of an HSC (hollow shaft cone) shaft. As an alternative, however, a so-called steep taper (ST) shaft or the like can be provided, for example. The cutting tool 10 can be used while immovably or rotatably driven.

At the front (left on FIG. 1) end of the cutting tool 10, five insert holders 14 are arranged in the base body 12 in an equidistant angular division. Each insert holder 14 carries a cutter 15, for example a cutting insert, a cutting plate or the like, and can be adjusted radially inwardly or outwardly synchronously with the respective other insert holders 14 by means of a central control device 16 visible on FIG. 2. Independently thereof, each insert holder 14 can be individually positionally adjusted via an allocated adjusting device 17 in a radial direction relative to the central control device 16 or to the longitudinal central axis or rotational axis 11 of the base body 12.

Insert Holder 14

The insert holders 14 are all characterized by an identical structural design and an identical operating principle, so that the structural design and operating principle of the roller holders 14 will be described below based on the example of the lower insert holder 14 shown on FIG. 2.

Figure 4:
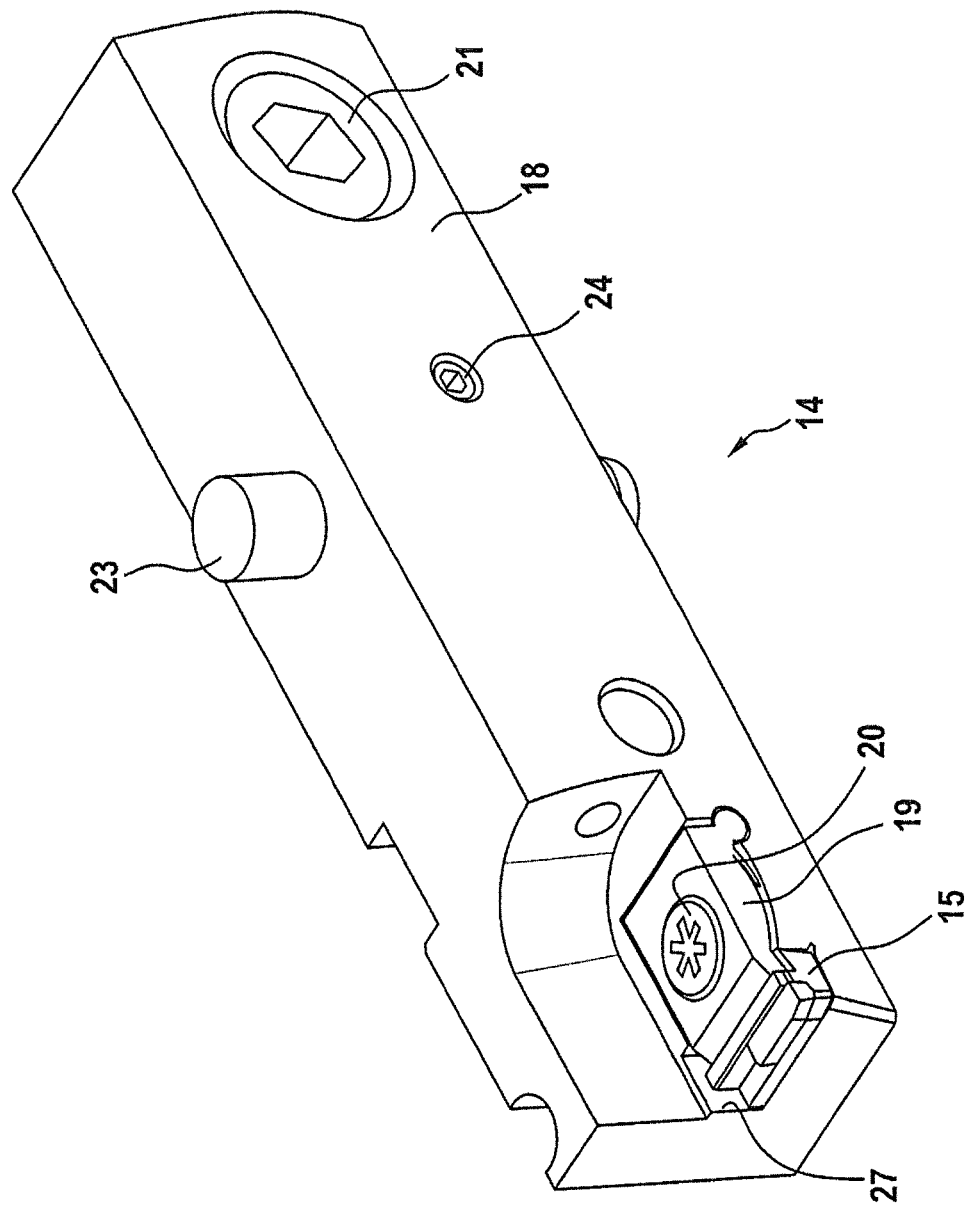
FIG. 4 is a perspective side view of an insert holder that carries a cutter.

The insert holder 14 shown on a magnified scale on FIG. 4 essentially has one holder body 18, the cutter 15 held on the holder arm 18, a clamping claw 19 for clamping the cutter 15 in place, a clamping screw 20, the adjusting device 17, a spring stop screw 21, a compression screw 22, a bearing bolt 23 and a locking screw 24.

Figure 3:
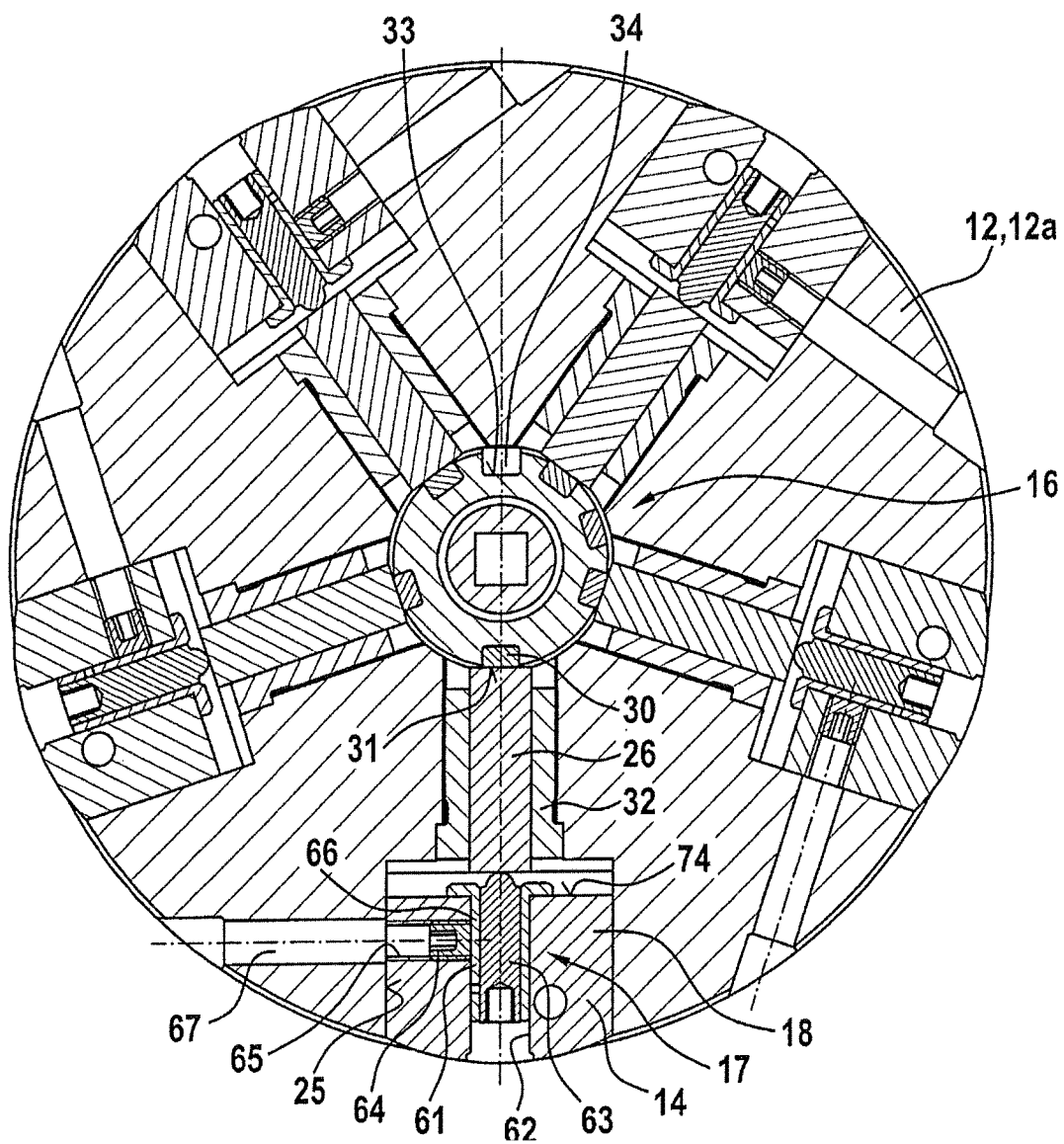
FIG. 3 is a cross sectional view of the cutting tool at the location denoted by a line III-III on FIG. 2.

As evident from FIG. 3, the holder body 18 is fabricated out of a prismatic or cuboid block, which is accommodated in a prismatic or cuboid receiving pocket 25 in the base body 12 that is open at the face and outer periphery, extends in the direction of the longitudinal central axis or rotational axis 11 of the base body 12, and is formed at a radial distance to the longitudinal central axis or rotational axis 11. In relation to a longitudinal sectional plane (see FIG. 3) containing the longitudinal central axis or rotational axis 11, the receiving pocket 25 is essentially symmetrically shaped in terms of its cross section (see FIG. 1).

The insert holder 14 is pivotably held in the receiving pocket 25 via a bearing bolt 23 that is mounted on the base body 12. The bearing bolt 23 penetrating through the holder body 18 extends in a direction transverse to the longitudinal central axis or rotational axis 11, and is arranged on both sides of the holder body 18 in axial bores in the base body 12 that are not denoted in any more detail. The bearing bolt 23 is captively secured to the holder body via the locking screw 24 that is accessible from the outer periphery and screwed in the holder body 18. The insert holder 14 is thus accommodated in the receiving pocket 25 so that it can pivot around a swivel axis aligned transverse to the longitudinal central axis or rotational axis 11.

The holder body 18 thus forms a two-sided lever, which is pivotably mounted like a rocker. As shown on FIG. 2, the adjusting device 17 on FIG. 2 is arranged on the side of the left, longer lever arm, while the compression spring 22 and spring stop screw 21 are arranged on the side of the right, shorter lever arm. The spring stop screw 21 comprises a holder body-side stop for the compression spring 22. The compression spring 22 exerts a spring force on the insert holder 14 via the shorter lever arm, such that the insert holder 14 on FIG. 2 is pivoted clockwise. FIG. 2 shows that the holder body 18 on the longer lever is supported on the central control device 16 via the adjusting device 17 and a pressure pin 26 arranged in the base body 12 in a radially displaceable manner.

As shown on FIG. 4, the cutter 15 is positively accommodated in a seat 27 that is accessible from the front and outer periphery and worked into the holder body 18, and is clamped against the holder body 18 by actuating the clamping screw 20 via the clamping claw 19.

Control Device 16

Figure 2:
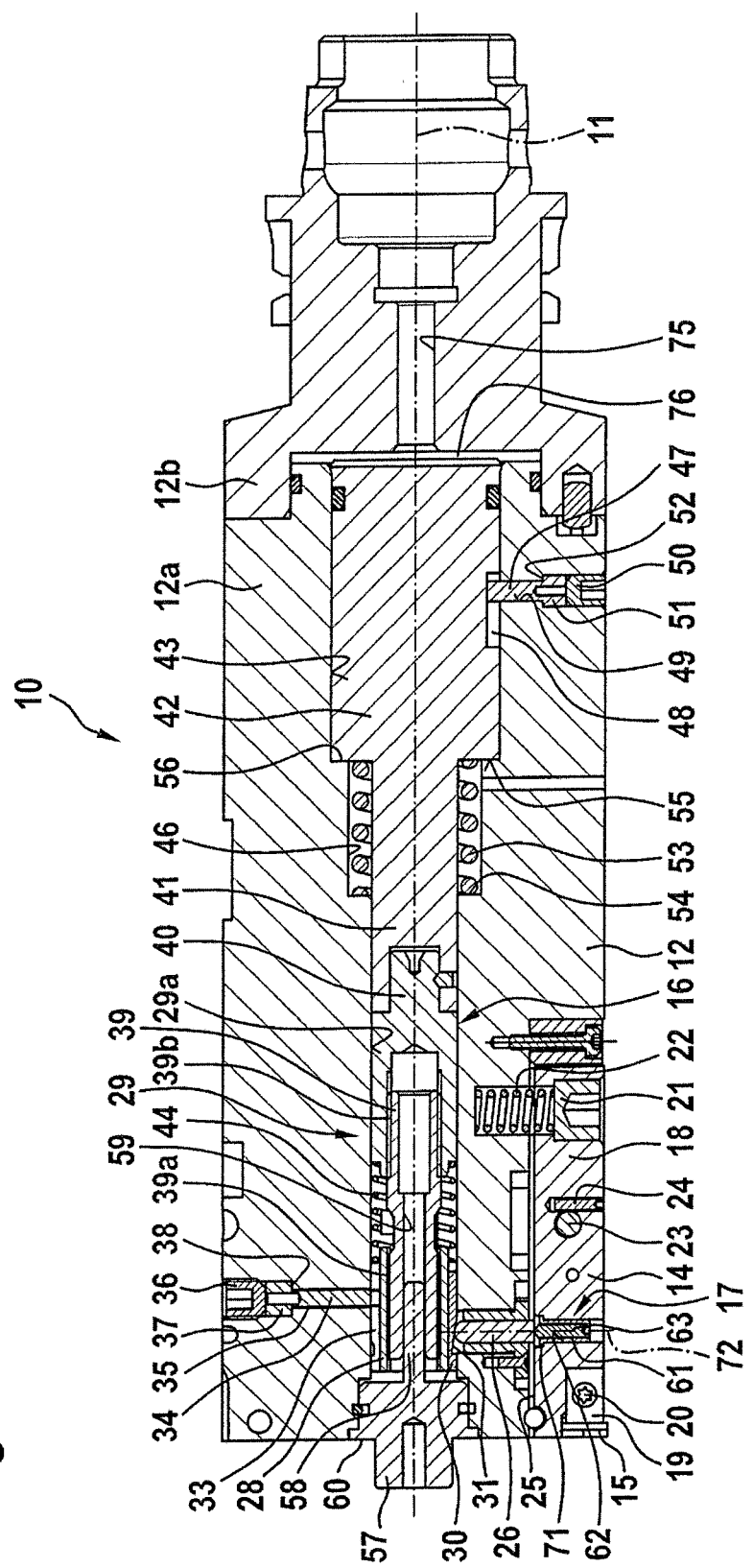
FIG. 2 is a longitudinal sectional view of the cutting tool.

As shown on FIG. 2, the central control device 16 has a threaded sleeve 28 arranged in the base body 12 and a threaded drive 29 that axially displaces the threaded sleeve 28.

The threaded sleeve 28 comprises a control means that induces a radial adjustment of the insert holders 14. It is arranged in a central bore 29a in the base body 12 in a nonrotatable, but axially displaceable manner, and interacts with the insert holders 14 via a wedge gear. To this end, as shown on FIG. 2, the outer periphery of the threaded sleeve 28 has a number of support strips 30 corresponding to the number of insert holders 14. Each support strip 30 is here allocated to one of the insert holders 14, and on the exterior has the control surface 31 that is slanted relative to the longitudinal central axis or rotational axis 11, against which the pressure pin 26 that interacts with the insert holder 14 abuts. Each pressure pin 26 is arranged in a radially running bore 27 in the base body 12 in a radially displaceable manner. The control slant 31 together with the front side of the pressure pin 26 forms the aforementioned wedge gear, which converts an axial movement by the threaded sleeve 28 into a radial movement of the pressure pin 26. The nonrotatable arrangement of the threaded sleeve 28 in the central bore 29a in the base body 12 is achieved by a locking pin 34 that engages into an axial longitudinal slit 33 on the outer periphery of the threaded sleeve 28, and is detachably held in a radial stepped bore 35 in the base body 12. As shown on FIG. 2, a locking screw 36 secures the engagement of the locking pin 34 in the longitudinal slit 33 of the threaded sleeve 28. The locking pin 34 has a head 37 with an enlarged diameter, which strikes radially inwardly against a step 38 of the stepped bore 35. By fixing the locking pin 34 in a radial direction in this way, the locking pin 34 can be prevented from pressing against the base of the longitudinal slit 33, and thereby impeding the axial displaceability of the threaded sleeve 28. Only the end of the locking pin 34 that engages into the longitudinal slit 33 is visible on FIG. 3, and is held at a radial distance to the floor of the longitudinal slit 33.

The threaded sleeve 28 is axially driven via the threaded drive 29. As shown on FIG. 2, the threaded drive 29 essentially has a threaded spindle 39 and a bearing bush 40 arranged at an axial distance to the threaded sleeve 28 in the central bore 29a in the base body 12. In the embodiment shown, the threaded spindle 39 is comprised of a differential threaded spindle, which is screwed with an internally threaded hole of the threaded sleeve 28 via a first threaded section 39a, and with an internally threaded hole of the bearing bush 40 via a second threaded section 39b.

Analogously to the threaded sleeve 28, the bearing bush 40 is arranged in the central bore 29a in the base body 12 in a nonrotatable, but axially displaceable manner. The nonrotatable arrangement of the bearing bush 40 is achieved by a nonrotatable connection with a piston extension 41 of a piston 42 to be described later, which is arranged in a piston bore 43 in the base body 12 in a nonrotatable, but axially displaceable manner.

A compression spring 44 is arranged between the threaded sleeve 28 and the bearing bush 40, so as to reduce a thread play between the male thread of the first threaded section 39a of the threaded spindle 39 and the female thread of the threaded sleeve 28 on the one hand, and to reduce a thread play between the male thread of the second threaded section 39b of the threaded spindle 39 and the female thread of the bearing bush 40 on the other.

The threaded drive 29 configured in this way offers two options for axially displacing the threaded sleeve 28 that are independent of each other:

1) Synchronous Inward/Outward Regulation of the Insert Holders 14

On the one hand, displacing the bearing bush 40 makes it possible to displace the entire threaded drive 29 along with the threaded sleeve 28 without twisting the threaded spindle 39, i.e., without a relative movement between the threaded sleeve 28 and the bearing bush 40. This adjustment option is used to synchronously adjust the insert holders 14 between an inwardly regulated position, in which the cutters 15 held on the insert holders 14 lie at a minimum diameter, and an outwardly regulated position, in which the cutters 15 held on the roller holder 14 lie at a maximum diameter.

To this end, the threaded drive 29, in particular the bearing bush 40, is connected with the already mentioned piston 42 in a tension/pressure-resistant manner. The piston 42 is arranged in a piston bore 43 in the base body 12 in a nonrotatable, but axially adjustable manner. As evident from FIG. 2, the piston bore 43 is connected with the central bore 29a via a connecting bore 46. The piston 42 with a step-like design has a piston extension 41, which penetrates through the connecting bore 46, and is connected with the bearing bush 40 in the area of the central bore 29a in a nonrotatable and tension/pressure-resistant manner. The nonrotatable arrangement of the piston 42 in the piston bore 43 is achieved by a locking pin 47 that engages into an axial longitudinal slit 48 on the outer periphery of the piston 42, and is detachably held in a radial stepped bore 49 in the base body 12. As shown on FIG. 2, a locking screw 50 secures the engagement of the locking pin 47 in the longitudinal slit 48 of the piston 42. The locking pin 47 has a head 51 with an enlarged diameter, which strikes radially inwardly against a step 52 of the stepped bore 49. By fixing the locking pin 47 in a radial direction in this way, the locking pin 47 can be prevented from pressing against the base of the longitudinal slit 48, and thereby impeding the axial displaceability of the piston.

Tensioned between the piston 42 and base body 12 is a compression spring 53, which displaces the piston 42 on FIG. 2 toward the right. The compression spring 53 is supported on a step 54 formed between the connecting bore 46 and central bore 29a on the base body side, while the compression spring 53 is supported on an annular surface 55 that envelops the piston extension 41 of the piston 42 on the piston side.

A step 56 formed between the connecting bore 46 and the piston bore 43 yields an axial stop for the piston 42. In the embodiment shown, the piston 42 is fluidically driven toward the left, against the spring force of the compression spring on FIG. 2. To this end, the piston 42 is accommodated in the piston bore 43 in a sealed manner. A pressure channel 75 formed in the base body 12 is used to feed a fluid pressure into a pressure chamber 76 of the piston bore 43 bordered by the piston, which displaces the piston 42 toward the left, against the spring force of the compression spring 53 on FIG. 2. Displacing the piston 42 induces a codirectional shifting of the bearing bush 40, and hence of the threaded drive 29 and the threaded sleeve 29.

The insert holders 14 supported on the control slants 31 of the threaded sleeve 26 can thus be synchronously inwardly and outwardly regulated, i.e., adjusted radially inward and outward, through exposure to a pressure of the piston 42 exerted by a machine tool.

2) Synchronous Coarse or Preliminary Adjustment of the Cutters 15

On the other hand, twisting the threaded spindle 39, e.g., in the state shown on FIG. 2 where the piston 42 abuts against the stop 56, makes it possible to adjust the threaded sleeve 28 relative to the bearing bush 40. Due to the nonrotatable and tension/pressure-resistant connection with the piston 42, neither the axial position nor the rotational position of the bearing bush 40 changes when twisting the threaded spindle 39. Suitably designing the difference in pitch between the first threaded section 39a and the second threaded section 39b of the threaded spindle makes it possible to achieve a precise displacement of the threaded sleeve 28, and thus a precise adjustment of the insert holders 14. This adjustment option can be used for a synchronous, coarse adjustment of the cutters 15 held on the insert holders 14 in the direction of a prescribed nominal diameter.

To this end, the control device 16 has a rotatable, but axially fixed actuating element 57 held on the end face of the base body 12, which engages with the thread spindle 39 in a nonrotatable, but axially movable manner. In the embodiment shown, the actuating element 57 has an extension 58 with a square cross section, which positively engages into an engagement opening 59 of the threaded spindle 39 having a square cross section. The threaded spindle 39 is also twisted along with the actuating element 57. Due to the screwed connection with the threaded sleeve 28, the latter is axially displaced when twisting the threaded spindle 39. With respect to an exemplary manual actuation of the actuating element 57, the actuating element can have a scale ring as visible on FIG. 1, which enables a verifiable twisting of the actuating element 57, and thus of the threaded spindle 39.

The insert holders 14 supported on the control slants of the threaded sleeve 28 can thus be synchronously set to a prescribed nominal diameter by rotationally actuating the actuating element 57 by hand or with a machine tool. This preliminary adjustment can be made in the outwardly regulated state of the insert holders 14 shown on FIG. 2, in which the cutter 15 lies at a maximum diameter. However, the preliminary adjustment can naturally also take place in an inwardly regulated state of the insert holders 14.

Adjusting Device 17

Precisely when it comes to machining a cylinder bore of a combustion engine, it is crucial that all cutters 15 lie exactly on a prescribed nominal diameter of the cutting tool 10. In order to satisfy this requirement, it must be possible to readjust the cutting tools 15 to a prescribed nominal diameter with µm precision. For example, this is required when the cutting tool 10 is newly delivered, or if wear necessitates that individual cutters 15 be readjusted.

For this purpose, the insert holders 14 are designed so as to each be positionally adjustable in relation to the base body 12, in particular to the central control device 16 arranged in the base body 12. Each insert holder 14 has allocated to it an individually actuatable adjusting device 17, which can be used to radially set the insert holder 14, and hence the cutter 15 held on the insert holder 14, relative to the base body 12, in particular to the longitudinal central axis or rotational axis 11.

The adjusting device 17 integrated into the holder body 18 on the side of the longer lever arm has a wall segment-slit threaded bush bore 61, which is integrally, positively and/or non-positively arranged in an essentially radially running threaded bush bore 62 in the holder body 18 in a rotatably and axially fixed manner in relation to the bore axis of the threaded bush bore 62, an adjusting screw 63 that is screwed into the threaded bush 61 and interacts with the corresponding control slant 31 of the threaded sleeve 28 via the already mentioned pressure pin 26, and a clamping screw 64 visible on FIG. 3 and arranged to the side of the threaded bush 61, which is screwed into a threaded hole 65 in the holder body 18 that runs transverse to the threaded bush bore 62, and as a pressure element presses an elastically deformable wall segment 66 inwardly against the adjusting screw 63.

The threaded hole 65 that accommodates the clamping screw 64 can be accessed from the outer periphery of the base body 12 via an engaging hole 67 in the base body 12 that is larger in terms of diameter. The diameter of the engaging hole 67 in the base body 12 can be so large that the clamping screw 64 that presses against the wall segment 66 of the threaded bush 61 can be actuated with the insert holder 14 in any swiveled position desired by means of a tool key, which is guided through the engaging hole 67 and engages into a width across flats of the clamping screw 64. As an alternative thereto, however, the diameter of the engaging hole 67 can also only be large enough that a tool key guided through the engaging hole 67 can only be introduced into the width across flats of the clamping screw 64 for a prescribed swiveled position range of the insert holder 14.

The threaded bush hole 62 penetrates through the holder body 18 in a radial direction, as shown on FIG. 2, so that the adjusting screw 63 can be adjusted radially from outside by means of a suitable tool key, which engages into a width across flats of the adjusting screw 63.

Figure 5:
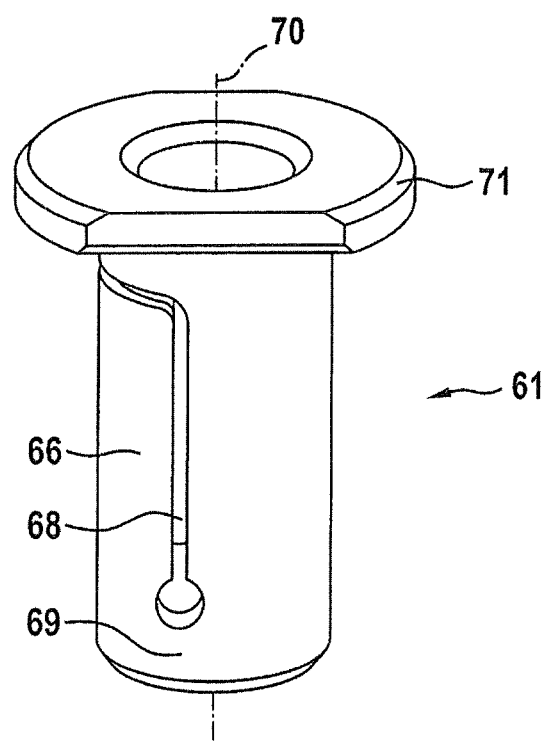
FIGS. 5 and 6 are different views of a threaded bush of the adjusting device according to the invention that has a slit wall segment.
Figure 6:
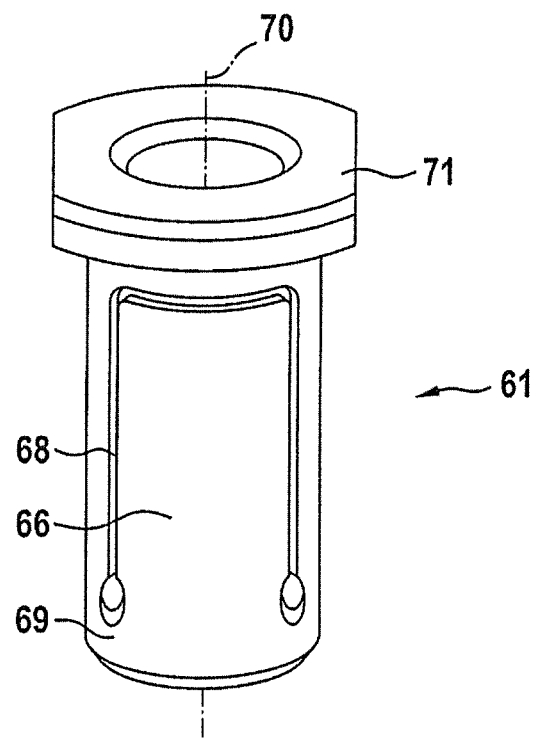

The threaded bush 61 is shown on FIG. 5 in particular. Visible is the wall segment 66, which is formed by a U-shaped slit 68 that penetrates through the threaded bush wall. FIG. 5 shows that the wall segment 66 extends in the axial direction of the threaded bush 61, and is still connected in such a way with the threaded bush wall at a section 69 forming a material joint that it can be deformed elastically inward in a direction transverse to the bush axis 70.

At the base body end, the threaded bush 61 has a flange 71, which determines the position of the threaded bush 61 in the direction of the bore axis 72 of the threaded bush bore 62 in the holder body 18 through abutment against a holder body-side stop 74 in the threaded bush bore 62.

Exerting pressure on the elastically flexible wall segment 66 of the threaded bush 61 by actuating the clamping screw 64 makes it possible to press the area of the female thread of the threaded bush 61 that corresponds to the wall segment 66 against the male thread of the adjusting screw 63 that is screwed into the threaded bush 61, so as to reduce the thread play between the female thread and male thread. By displacing the area of the female thread of the threaded bush 61 that corresponds to the wall segment 66 against the male thread of the adjusting screw 63, the thread flanks of the female thread are pressed in both directions against the opposing thread flanks of the male thread. The thread play is thus reduced on both sides of each thread flank of the area of the female thread of the thread bush 61 that corresponds to the wall segment 66. Thanks to the pressure element designed as a clamping screw 64, the thread play can be not only reduced, but set or corrected to an extent that just still allows a screw actuation of the adjusting screw 63, but eliminates any disruptive thread play.

FIG. 2 shows that the adjusting screw 63 is supported at its base body-side, rounded end on the already mentioned pressure pin 26, and by means of the pressure pin 26 on the allocated control slant 31 of the threaded bush 28 of the central control device 16.

The adjusting device 17 integrated into the insert holder 14 thus enables a zero backlash, fine adjustment of the cutter 15 relative to the longitudinal central axis or rotational axis 11 of the cutting tool 10.

Integrating the adjusting device 17 into the holder body 18 yields a compactly designed insert holder 14, which can be handled as a replaceable component with the integrated adjusting device 17 and the cutter 15, and secured to the base body 12 of the cutting tool 10.

Additional Embodiments

Modifications can of course be made to the embodiment described above without departing from the basic idea of the invention as defined by the claims.

In the embodiment shown, the adjusting device is integrated into the insert holder. This is advantageous in particular if a second control device is provided. However, this need not necessarily be the case. If the cutting tool has no central control device, the adjusting device can be integrated either into the insert holder or into the base body. It is only crucial that the adjusting device be functionally arranged between the cutter and the base body.

In addition, the adjusting screw can interact with the base body or the insert holder indirectly, for example as in the previously described embodiment, or even directly.

In the embodiment shown, each insert holder carries exactly one cutter. The insert holder can carry at least one additional cutting plate which, as viewed in the axial direction of the cutting tool, is arranged at the height of the swivel axis of the insert holder, for example. The position of the additional cutting plate arranged in this way would then essentially not be influenced by an adjustment or calibration performed by means of the control device and/or adjusting device, and can be provided for generating a chamfer or the like, for example.

The cutter can consist of a cutting insert, a cutting plate or the like.

In the embodiment shown, each insert holder is arranged in a receiving pocket on the base body so that it can pivot like a rocker. In a departure therefrom, each insert holder can also be designed like an elastically deformable bending beam and fixedly screwed in a receiving pocket on the base body of a cutting tool. In another modification, each insert holder can be held in a receiving pocket on the base body of a cutting tool in a radially displaceable manner. The indications used above (in a radial direction), "inwardly/outwardly regulatable", "inwardly/outwardly regulated", "inwardly/outwardly regulate", etc., are thus to be generally understood to mean that the insert holder(s) can be adjusted (in a radial direction), wherein the adjustment can take place by pivoting (as in the embodiment shown), elastically deforming or linearly displacing the respective insert holder.

In the embodiment shown, the piston is pressurized fluidically, in particular pneumatically or hydraulically. Alternatively thereto, an electric motor or electromagnet can be used to initiate the pressurization of the piston. The cutting tool can thus have a hydraulically, pneumatically, electromotively or electromagnetically operating actuator that drives the piston.

In the embodiment shown, the cutting tool has an HSC (hollow shaft cone) shaft on the machine tool spindle side. As an alternative thereto, however, a so-called steep taper (ST) shaft or the like can also be provided.

In the embodiment shown, the cutting tool is used for cylinder bore processing. However, the invention is not limited to this application. A cutting tool according to the invention can be used for reworking or finely machining a bore to a prescribed nominal diameter.

In the embodiment shown, several insert holders are additionally arranged on the base body of the cutting tool at the same height in an axial direction and at prescribed angular distances around the longitudinal central axis or rotational axis of the base body. However, it is not mandatory that the insert holders be arranged at the identical height in an axial direction. The insert holders can also be arranged axially offset, for example helically offset.

In addition, the cutting tool can have exactly one insert holder or several of them, as in the embodiment described.

The control surfaces provided on the threaded sleeve can be directly incorporated into the threaded sleeve material. In other words, the support strips can be eliminated. In addition, the threaded sleeve can have a rotationally symmetrical conical surface instead of individual control surfaces, which indirectly or directly supports the insert holder(s).

The invention claimed is:

1. A tool that provides for finely adjusting at least one insert holder adjustably held on a base body of the tool relative to the base body, the tool comprising:
    a threaded drive,
    a threaded sleeve,
    at least a first pressure pin,
    at least a first threaded bush,
    at least a first adjusting screw, and
    at least a first pressure element,
    the threaded sleeve is threaded with the threaded drive,
    the threaded sleeve is non-rotatable,
    rotation of the threaded drive causes axial movement of the threaded sleeve,
    the threaded sleeve comprises at least a first slanted surface,
    the first slanted surface is slanted relative to a rotational axis of the tool,
    a first portion of the first pressure pin is in contact with the first slanted surface whereby axial movement of the threaded sleeve causes radial movement of the first pressure pin,
    the first adjusting screw is threaded with the first threaded bush,
    the first adjusting screw is prevented from moving axially inward at least in part by the pressure pin,
    rotation of the first adjusting screw causes movement of the first threaded bush along an axis of the first threaded bush,
    the first threaded bush comprises at least a first wall segment that is elastically deformable transverse to the axis of the first threaded bush,
    the first pressure element is arranged to a side of the first threaded bush, and
    the first pressure element is configured to selectively press the first wall segment against the first adjusting screw.

2. The tool according to claim 1, wherein the first wall segment is comprised of a slit that penetrates through a bush wall of the first threaded bush.

3. The tool according to claim 2, wherein the slit is essentially U-shaped in design.

4. The tool according to claim 3, wherein the first wall segment extends in an axial direction of the threaded bush.

5. The tool according to claim 1, wherein one end of the first threaded bush has a flange that comprises a stop.

6. The tool according to claim 1, wherein the first pressure element consists of a clamping screw.

7. The tool according to claim 1, wherein the first pressure element presses essentially radially against the first wall segment.

8. A cutting tool comprising a tool according to claim 1, and at least a first cutter.

9. The cutting tool according to claim 8, wherein:
    the adjusting screw is supported on the first cutter.

10. The cutting tool according to claim 8, wherein:
    a first insert holder carries the first cutter and is axially and/or radially adjustable on the base body, and
    the first adjusting screw is supported on the base body.

11. The cutting tool according to claim 10, wherein the first insert holder is designed as a two-aimed lever pivotably held on the base body like a rocker.

12. The cutting tool according to claim 10, wherein the first threaded bush is arranged in a through hole in the first insert holder, which allows access for actuating the first adjusting screw from a side facing away from the base body.

13. The cutting tool according to claim 12, wherein the first threaded bush is positively and/or non-positively fixed in an axial and/or peripheral direction of the through hole.

* * * * *